(12) United States Patent
Hobmeyr et al.

(10) Patent No.: US 7,413,822 B2
(45) Date of Patent: Aug. 19, 2008

(54) DEVICE AND METHOD TO RELEASE THE OVERPRESSURE OF A FUEL CELL COOLANT TANK

(75) Inventors: Ralph T. J. Hobmeyr, Mainz-Kastel (DE); Ferdinand Foeh, Mainz-Kastel (DE); Uwe Hannesen, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 434 days.

(21) Appl. No.: 11/313,160

(22) Filed: Dec. 20, 2005

(65) Prior Publication Data
US 2007/0141421 A1   Jun. 21, 2007

(51) Int. Cl.
*H01M 8/00* (2006.01)
*H01M 8/04* (2006.01)

(52) U.S. Cl. .................. 429/13; 429/26; 429/25

(58) Field of Classification Search .......... 429/13, 429/26, 25
See application file for complete search history.

(56) References Cited

U.S. PATENT DOCUMENTS 5,429,885 A * 7/1995 Stockburger et al. .......... 429/13

* cited by examiner

*Primary Examiner*—Patrick Ryan
*Assistant Examiner*—Thomas H. Parsons

(57) ABSTRACT

A device and method to convert residual hydrogen present in a fuel cell cooling system into water. An oxygen-bearing fluid is supplied to the cooling system from a source that also has elevated moisture levels to minimize the likelihood that the oxygen-bearing fluid will dry out or otherwise deplete the coolant in the cooling system. One or more valves are included to avoid the formation of adverse pressure gradients that could inhibit the continued supply of the oxygen-bearing fluid to the cooling system.

20 Claims, 6 Drawing Sheets

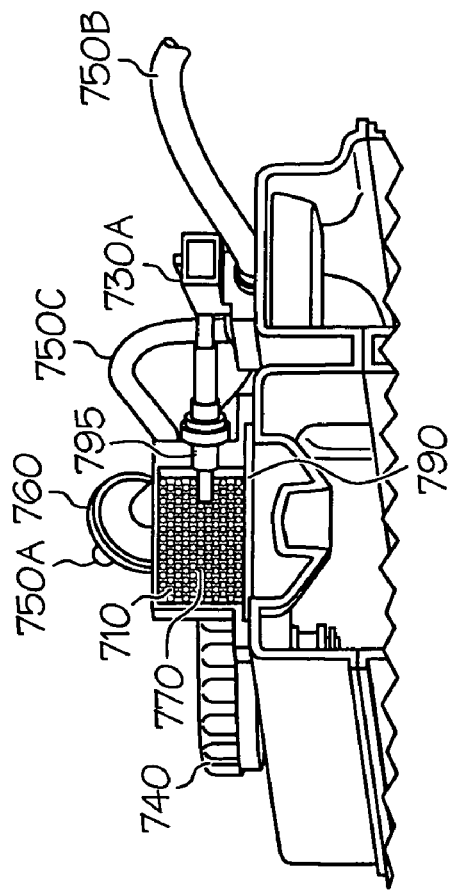
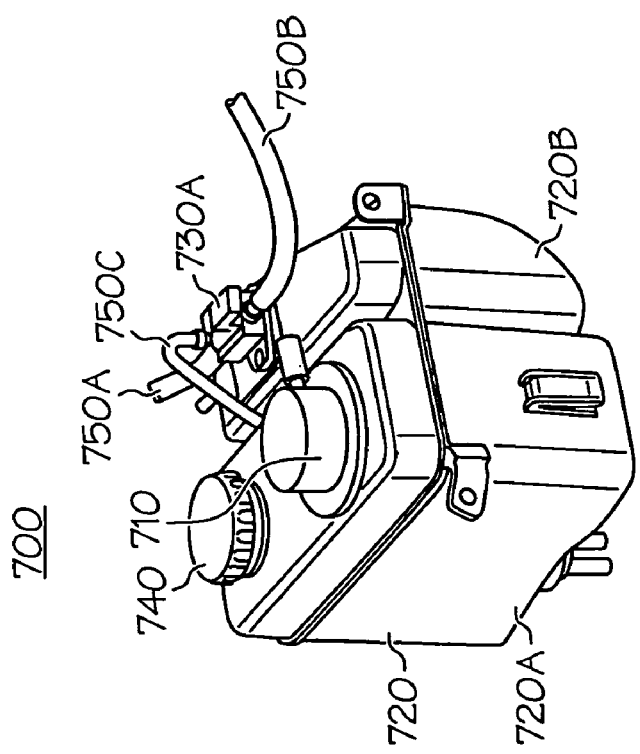
FIG. 4B
FIG. 4A

DEVICE AND METHOD TO RELEASE THE OVERPRESSURE OF A FUEL CELL COOLANT TANK

BACKGROUND OF THE INVENTION

The present invention relates generally to ways to convert unreacted hydrogen present in a fuel cell coolant into water, and more particularly to ways to reduce the buildup of pressure within a coolant tank so that oxygen used to react with the hydrogen can be introduced into a reaction chamber for the catalytic removal of the hydrogen regardless of the fuel cell power output.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. An appropriate catalyst (for example, platinum) ionizes the hydrogen into a proton and electron on the anode side such that upon subsequent combination of the proton with oxygen and the electrons at the cathode side, electric current is produced with high temperature water vapor as a reaction byproduct.

In one form of fuel cell, called the proton exchange membrane (PEM) fuel cell, an electrolyte in the form of a membrane is sandwiched between two electrode plates that make up the anode and cathode. The membrane may be formed from a perfluorinated polymer containing sulphonic acid, which allows the formation of negatively charged transfer sites that can conduct positively charged ions formed in the anode. In the case of hydrogen fuel as one of the reactants, the positively charged hydrogen ions pass through the membrane to react with oxygen and electrons present on the cathode. This layered structure of membrane sandwiched between two electrode plates is commonly referred to as a membrane electrode assembly (MEA), and forms a single fuel cell. Many such single cells can be combined to form a fuel cell stack, increasing the power output thereof. While the present invention is especially applicable to the PEM fuel cell, it will be appreciated by those skilled in the art that the use of other fuel cell configurations with the present invention is also within the purview of the present disclosure.

The reaction at a fuel cell cathode is exothermic, giving off a significant amount of heat. Accordingly, fuel cells with larger power outputs, such as in automotive applications, where tens (if not hundreds) of kilowatts may be required, are equipped with supplemental (usually liquid-based) cooling systems to prevent damage to the fuel cell components. The coolant can be supplied through various sources, such as a dedicated circuit including a cooling tank. Coolant make-up components may be further included to augment the supply of coolant lost due to leakage, evaporation or the like. In one form of coolant delivery, coolant distribution plates with flow channels can be placed between the various anode and cathode plates to conduct away heat produced by the aforementioned reaction. In addition to cooling, humidification schemes are often necessary to maintain a proper water balance in the fuel cell. One use for such humidification is to keep the membrane from drying out and producing a concomitant reduction in proton conductivity.

The high pressures and closely-spaced relationship between both the reactant and coolant flowpaths means that some fluid crosstalk and related contamination will occur. Thus, excess (unreacted) quantities of hydrogen may build up in the coolant. It is desirable to reduce the presence of this unreacted hydrogen in the coolant. One way to achieve this reduction is to pass the hydrogen-contaminated coolant through a catalytic reaction between the hydrogen and an oxygen-bearing fluid (such as ambient air from an air ventilation flow) to convert the hydrogen into water in a manner similar to that occurring on the fuel cell cathode. Unfortunately, this approach is disadvantageous because the presence of the relatively dry ventilation air that is necessary to sustain the reaction at the catalyst tends to draw away the much-needed humidity (and water) from the cooling system, necessitating coolant make-up. In addition, the buildup of water resulting from the catalytic conversion of the excess hydrogen is problematic because it increases the pressure within a closed cooling system, which tends to hamper further operation of the hydrogen-removing reaction. Furthermore, if the pressure within the cooling system were allowed to consistently remain above that of the cathode or anode loop of the fuel cell, small leakages of cooling fluid (which may contain glycol or related materials) from the coolant system would find their way into the cathode or anode loop, with a potential loss in fuel cell durability. In addition, it is important for service to have access to the open coolant tank. Yet the direct contact of service personnel to hydrogen is undesirable in an open system, as an ignition source could lead to a fire.

Accordingly, there exists a need to ensure thorough removal of unreacted hydrogen from the cooling system of an operating fuel cell. There further exists a need to relieve the pressure buildup in a cooling system so that an oxygen-bearing fluid can be delivered to the catalytic reaction site regardless of the power setting in the fuel cell.

BRIEF SUMMARY OF THE INVENTION

These needs are met by the present invention, wherein an electrochemical conversion assembly (such as a fuel cell system) and a method of operating the assembly that incorporates the features discussed below is disclosed. In accordance with a first aspect of the present invention, a fuel cell assembly includes at least one fuel cell and a cooling system. The fuel cell includes electrodes in the form of an anode and a cathode, and can be a single cell, or multiple cells connected to define a fuel cell stack. Flowpaths corresponding to each of the anode and cathode are used to convey reactants to the respective electrode, while the cathode flowpath further is used to convey water vapor and other reaction products away from the fuel cell. A first reactant (for example, a hydrogen-bearing fluid, compound or related reductant) can be introduced into the anode, while a second reactant (for example, an oxygen-bearing fluid, compound or related oxidant) can be introduced into the cathode. In the present context, the term "compound" is meant to include not just substances whose molecules of unlike atoms cannot be separated by physical means, but also elemental components thereof.

The cooling system includes a coolant reservoir and any piping, tubing, conduit or related flowpath hardware necessary to ensure that the cooling fluid can be conveyed to the fuel cell. The cooling system also includes a hydrogen removal unit (HRU) which can selectively receive the oxygen-bearing (and relatively high humidity) airflow from the fuel cell such that a reaction in the HRU between oxygen and the hitherto unreacted hydrogen reduces the amount of hydrogen therein. It will be understood by those skilled in the art that the terms "unreacted", "excess" or "residual" (as well as variations thereof) as applied to hydrogen refer to that unwanted hydrogen that has contaminated the coolant through leakage, diffusion or other unintentional means; it does not refer to the molecularly bonded hydrogen and oxygen that forms an inherent part of water. By the reaction in the HRU, the hydrogen is converted to a coolant compound (such as water), which then intermixes with the rest of the coolant in the cooling system. The cooling system also includes a reservoir fluidly coupled to the HRU to contain a quantity of fuel cell coolant, as well as to receive coolant compound generated by the reaction of hydrogen and oxygen in the HRU. At least one flow regulating device is included to selectively relieve the pressure built up in the cooling system. This enables the oxygen-bearing compound coming from the cathode flowpath to flow from the cathode flowpath to the cooling system over a substantial majority of the operating pressures generated during operation of the fuel cell.

Optionally, the coolant reservoir is in the form of a coolant tank to hold the coolant used for the assembly. In one form, the coolant tank includes a first section configured to contain the fluid at a first temperature and a second section in selective fluid communication with the first section. The second section contains the fluid at a second temperature that is lower than the first temperature. The cathode flowpath of the fuel cell may include a cathode inlet flowpath configured to receive the oxygen-bearing compound, and a cathode exhaust flowpath to receive the reaction product formed by the operation of the fuel cell. The flow regulating device is optionally in the form of one or more valves, for example, a three-way valve or a pair of two-way valves. A three-way valve typically involves one of two extreme flow positions, and sometimes a position where all flowpaths are closed to flow. Regarding the flow positions, the first directs an incoming flow to one of two alternate outlet paths, while a second directs two different incoming flowpaths to a single outlet path. By contrast, a two-way valve is a type of shutoff valve that has a single inlet path and outlet path. The flow regulating devices may be passive, in that they are responsive to a predetermined pressure threshold. They may also be active, in that they are controlled by an external actuation source and responsive to a predetermined control signal from a controller that is based on one or more sensed parameters. In this latter configuration, the controller is responsive to signals sent from the one or more temperature sensors, and can send output signals to actuate the valve(s) or other components used to relieve pressure buildup in the coolant reservoir. An example of such a controller could be a programmable logic controller, and it can also be used to control operation of a compressor to provide an intermittent pressure boost to the cathode flowpath to ensure that there is always a positive pressure differential between the cathode flowpath and the cooling system. In one example, a mapping of the different system points can be stored in a memory device that is part of accessible by the controller. Other parameters, including (but not necessarily limited to) power, rotational speed, volume flow in the anode and cathode and the pressure in the cathode loop, can be monitored and relied upon to manipulate valves or related flow control devices, thereby feeding the coolant tank with cathode air.

In another option, the HRU preferably includes a catalytic reaction site which may include a bed of catalytic pellets. The reaction site and pellets together may be placed in a reaction chamber. In another option, a vehicle may incorporate the aforementioned fuel cell assembly as a source of motive power for the vehicle. A representative (although not exhaustive) list of vehicles that can be powered by the fuel cell assembly of the present invention include cars, trucks, aircraft, watercraft, motorcycles or the like.

According to another aspect of the invention, a device for reducing hydrogen presence in a fuel cell cooling system is disclosed. The device includes an HRU and one or more valves in fluid communication with the HRU. As previously discussed, the HRU is configured to receive the gas from the coolant tank such that a reaction between residual hydrogen and oxygen received from a cathode flowpath converts at least a portion of that hydrogen into water. The valve(s) can relieve a pressure buildup formed in the cooling system by the reaction. Through the pressure relief action of the one or more valves, a positive pressure difference can be maintained by the cathode flowpath over the cooling system. This is especially valuable during low power settings, as in such circumstances, only a small boost in pressure of the cathode flowpath over ambient is realized, and without the pressure differential made possible by the relief in the cooling system, it would be difficult to force the flow of an oxygen-bearing fluid from the cathode flowpath to the cooling system without a supplemental pressure source in the cathode flowpath. By operation of the valve(s) for pressure relief, a positive pressure differential is maintained by the cathode flowpath over the cooling system during a majority of fuel cell power settings. In the present context, a positive pressure differential is maintained by the cathode flowpath relative to the cooling system when the pressure is higher in the former than in the latter.

Optionally, the valve can be a three-way valve or numerous two-way valves, both as previously described. Additional flow control devices, such as a check valve can be placed between the cathode flowpath and the HRU such that if an adverse pressure gradient (i.e., that the pressure in the HRU or other parts of the cooling system that are in fluid communication with the HRU were greater than the pressure in the cathode flowpath) existed between the two, the check valve would prevent the coolant present in the cooling system from flowing into the cathode flowpath.

According to another aspect of the invention, a method of removing hydrogen from coolant that is used to regulate the temperature of an operating fuel cell is disclosed. The method includes conveying at least a portion of an oxygen-bearing fluid that is being used as a reactant in the fuel cell into an HRU. A cooling system is used to circulate coolant adjacent the fuel cell such that the coolant is in thermal communication with the fuel cell. By circulating the coolant through the HRU in the presence of the oxygen-bearing fluid, at least a portion of any residual hydrogen present in the coolant will react with oxygen. Any increases in cooling system pressure can be selectively relieved so that the pressure in the cooling system is no greater than a pressure present in a portion of the fuel cell that conveys the oxygen-bearing fluid. The increase in pressure may arise from, for example, the hydrogen-oxygen reaction mentioned above, as well as from other causes. By keeping the pressure in the cooling system low, the present method reduces the likelihood of glycol finding its way into the anode or cathode flowpaths.

Preferably, the pressure relief is enabled by one or more valves fluidly coupled to the cooling system, the portion of the fuel cell that conveys the oxygen-bearing fluid, or both. The valves may be pressure relief valves that are passively controlled, or may be signally coupled to a controller or the like so that they are configured to actuate upon receipt of an appropriate control signal. In one optional form, the oxygen-bearing flowpath provides oxygen in a higher humidity form than exists in an ambient environment. In another option, the reaction within the HRU is a catalytic reaction. In another option, the selective relieving of the cooling system pressure comprises relieving the pressure built up once the pressure goes about a predetermined value, such as above an ambient pressure. Other relief valves may be employed to ensure that the pressure of the tank is never much lower than the ambient pressure around the cooling path. This reduces the chances of a gas or liquid from the cathode, anode or ambient environment being introduced into the cooling system in an uncontrolled fashion.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which:

FIG. 4A shows a perspective view of the hydrogen removal unit and coolant tank assembly according to an embodiment the present invention;

FIG. 4B shows a partial cutaway view of the hydrogen removal unit of FIG. 4A.

DETAILED DESCRIPTION OF THE PREFERRED EMBODIMENTS

Figure 1A:
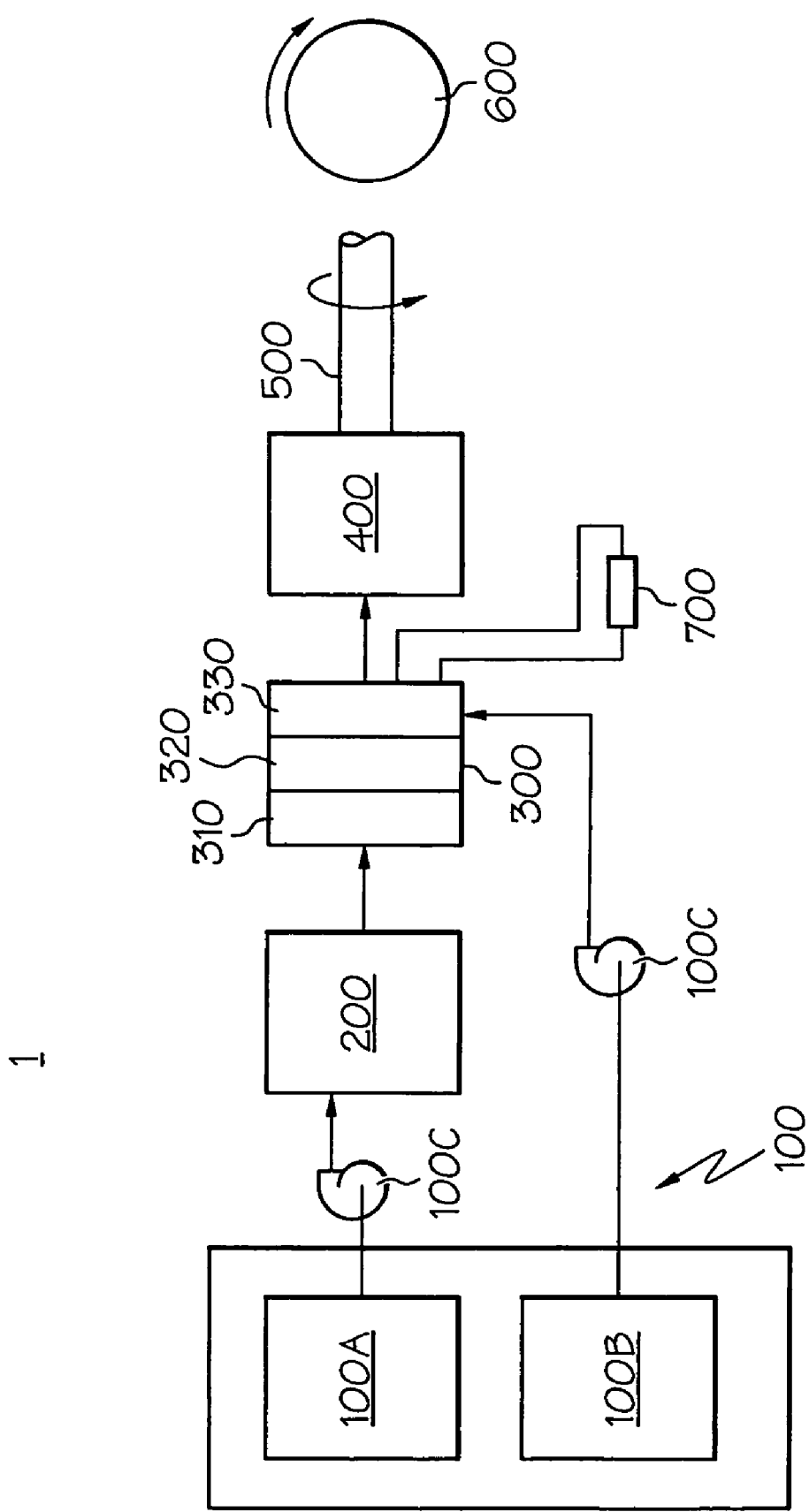
FIG. 1A shows a block diagram of a fuel cell system configured for vehicular application.
Figure 1B:
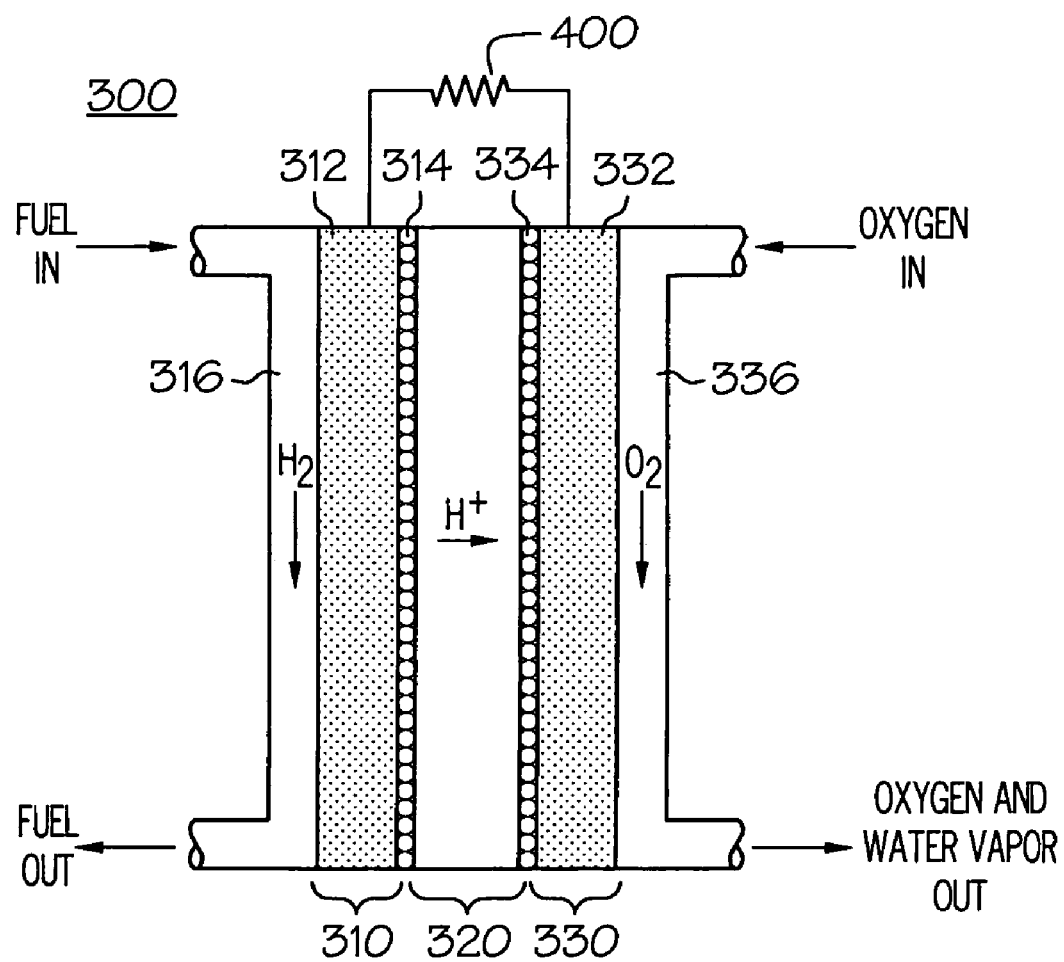
FIG. 1B shows a fuel cell configured for a vehicular application.
Figure 5:
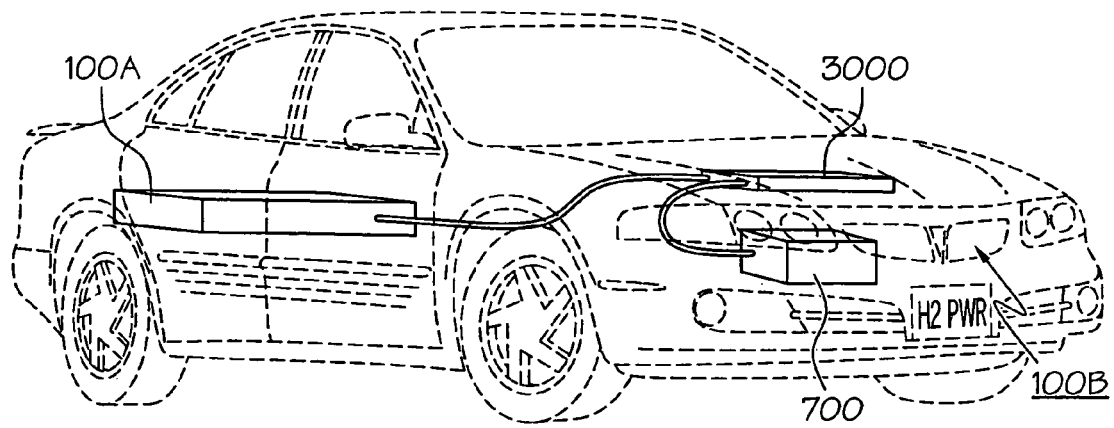
FIG. 5 shows a vehicle employing the fuel cell system of the present invention.

Referring initially to FIGS. 1A, 1B and 5, a block diagram highlights the major components of a mobile fuel cell system 1 according to the present invention (FIG. 1), as well as a representative placement of a fuel cell system into an automotive application (FIG. 5). Referring with particularity to FIG. 1A, the system 1 includes a reactant delivery system 100 (made up of fuel source 100A, oxygen source 100B and one or more compressors 100C), fuel processing system 200, fuel cell 300, one or more energy storage devices 400 (currently shown as a load on the fuel cell 300), a drivetrain 500 and one or more motive devices 600, shown notionally as a wheel. A cooling system 700 (as will be described in more detail below) is connected to the fuel cell 300 to facilitate thermal management thereof. It will be appreciated by those skilled in the art that not every system may require a compressor. For example, in configurations where one or both of the fuel or oxygen sources 100A, 100B are supplied via pressurized tank or related container, such compressors may be dispensed with. While the present system 1 is shown for mobile (such as vehicular) applications, it will be appreciated by those skilled in the art that the use of the fuel cell 300 and its ancillary equipment is equally applicable to stationary applications. It will further be appreciated by those skilled in the art that the term "fuel cell", while generally indicative of a single fuel cell within a larger stack of such cells, may also be used to define the stack. Such usage will be clear, based on the context.

The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600.

Referring with particularity to FIG. 1B, fuel cell 300 includes an anode 310, cathode 330, and an electrolyte layer 320 disposed between anode 310 and cathode 330. The anode 310 includes an electrode substrate 312 and catalyst layer 314 connected to a flowpath 316. The cathode 330 includes an electrode substrate 332 and catalyst layer 334 connected to a flowpath 336. Anode and cathode flowpaths 316, 336 contact their respective anode and cathode to allow delivery of the appropriate reactants. Fuel (typically in the form of gaseous hydrogen) comes in contact with a catalyst (such as platinum or a related noble metal) on the catalyst layer 314 of anode 310. Electrochemical oxidation of the hydrogen fuel proceeds by what is believed to be a dissociate adsorption reaction facilitated by the catalyst. The positively-charged hydrogen ion (proton) produced at the anode 310 then passes through the electrolyte 320 to react with the negatively-charged oxygen ions generated at the cathode 330. By virtue of the formation of water as a byproduct of the reaction between hydrogen an oxygen at cathode 330, the cathode 330 is referred to as the "wet" end of fuel cell 300, while the anode 310 is referred to as the "dry" end. Consequently, the fluid flowing at the wet end has, in addition to oxygen, an elevated moisture content (for example, in the form of humidity) that can be used to supply oxygen for a hydrogen-removal reaction while not drying out the coolant adjacent the reaction site in the way a lower humidity airflow would. The flow of liberated electrons from the ionization of the fuel sets up a current through an external circuit that may include the energy storing devices or other load 400 such that a motor or related current-responsive device may be turned. Although only a single fuel cell 300 is shown in FIG. 1, it will be appreciated by those skilled in the art that fuel cell system 1 (especially those for vehicular and related applications) may be made from a stack 3000 (shown in FIGS. 2 through 4) of such cells serially connected.

Figure 2:
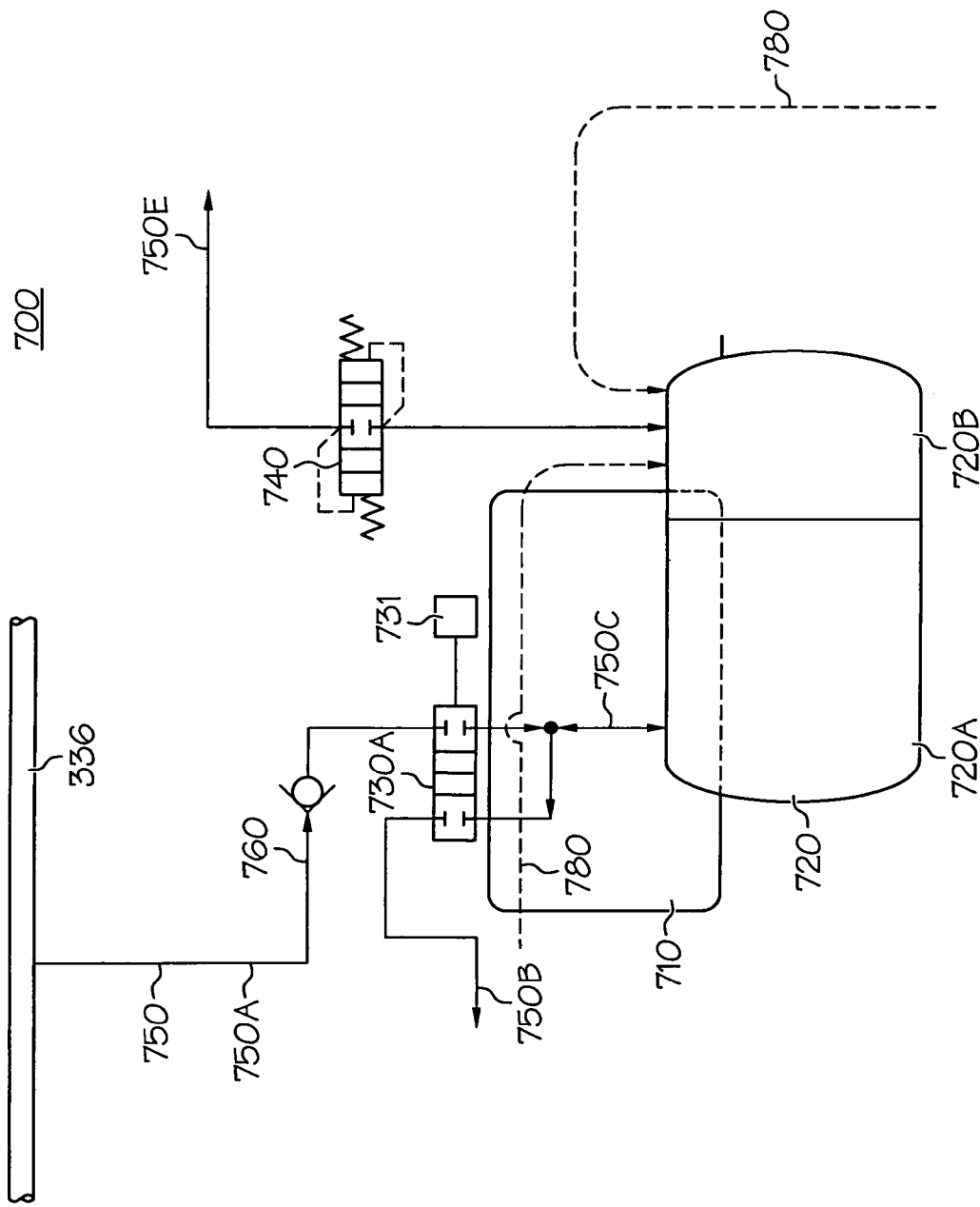
FIG. 2 shows schematically the operation of the hydrogen removal unit and coolant tank assembly according to an embodiment of the present invention.
Figure 3:
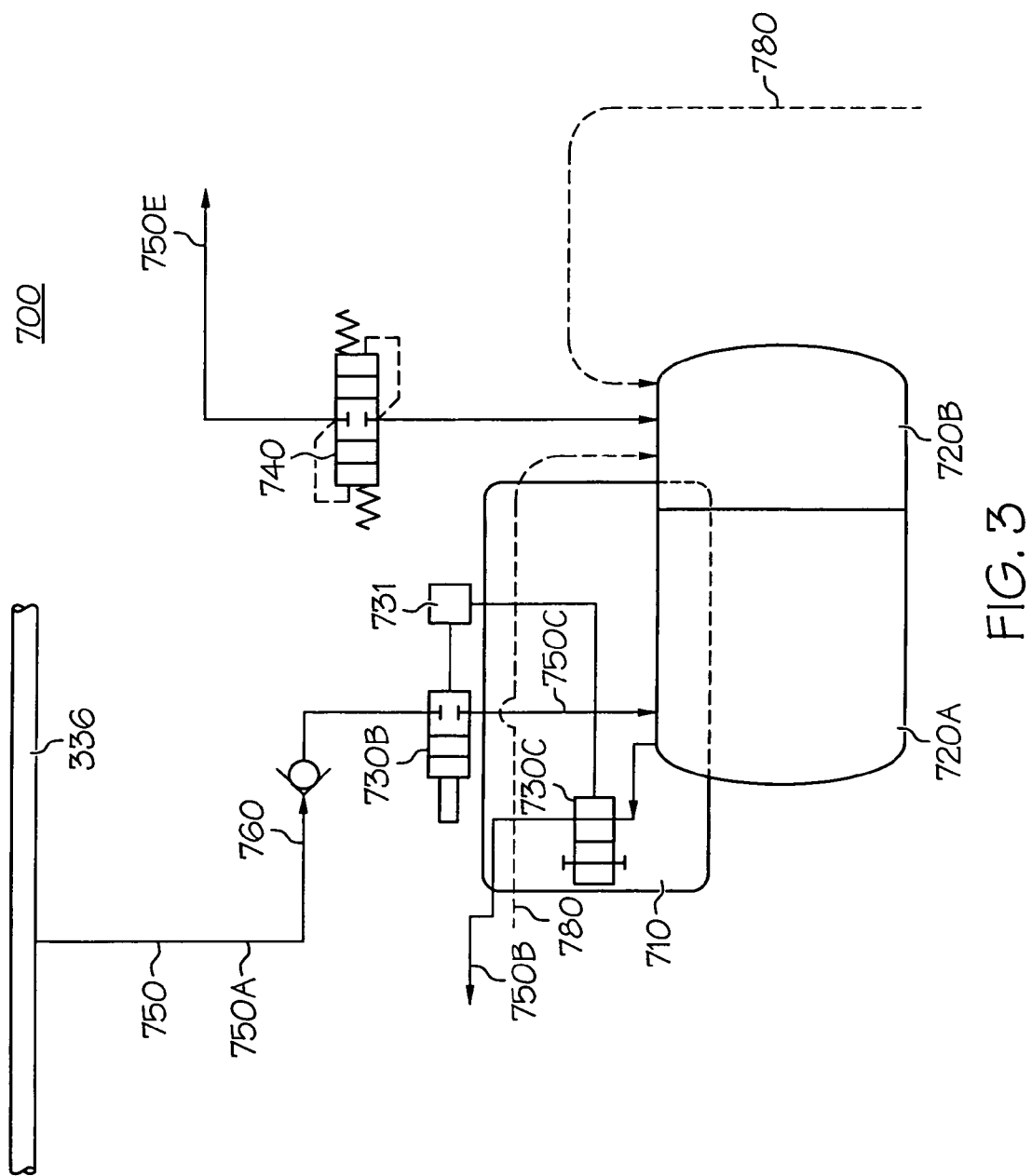
FIG. 3 shows an alternate embodiment of the present invention.

Referring next to FIGS. 2 and 3, block diagrams showing alternate embodiments of the cooling system 700 are shown. The cooling system 700 includes an HRU 710, coolant reservoir (alternately referred to as a tank) 720 and conduit 750 necessary to convey fluid throughout the system 700. The catalytic reaction within the HRU 710 relies upon the continued introduction of air supplied from the cathode flowpath 336 through inlet section 750A of conduit 750. While such air is necessary, it is desirable to avoid having the air provide a constant purge of coolant in the cooling system 700 that in turn cools the fuel cells 300. Flow regulating devices (for example, valves, discussed in more detail below) are placed in conduit 750 of the cooling system 700 to control the pressure that builds up in the reservoir 720 as a result of the increased water presence resulting from leakage of the anode and cathode flowpaths 316, 336, as well as from the catalytic reaction of the residual hydrogen and the air introduced from cathode flowpath 336. This can help to equalize the pressure over the various fuel cell 300 compartments. For example, the anode and cathode pressure is typically at or over 200 kPa, sometimes going up to approximately 270 kPa. To avoid having cooling water (such as glycol) introduced into both loops, the pressure of the cooling system 700 has to be much lower, preferably at or below approximately 160 kPa.

To reduce the pressure buildup in the coolant tanks, various valve arrangements are possible. Referring with particularity to FIG. 2, a single three-way valve 730A is placed in conduit 750 to control fluid flow between the cathode flowpath 336, coolant tank 720 and an exhaust to the ambient environment.

Valve 730A can be controlled by various means 731, including motors, magnets, solenoids or other electromechanical devices that can be made to actuate the valve based on a signal from a controller (not shown) that in turn can be responsive to the attainment of a preset value from a sensor (not shown). In addition to inlet section 750A, conduit 750 includes an outlet section 750B (that leads to an exhaust to the ambient environment) and an intermediate section 750C that connects the cathode flowpath 336 to the HRU 710 and the coolant tank 720. The first part of conduit 750, shown as the inlet section 750A, fluidly connects the cathode flowpath 336 to three-way valve 730A. A check valve 760 is placed in inlet section 750A to ensure that coolant or fluids generated by a reaction in HRU 710 do not flow into the cathode flowpath 336 during adverse pressure differentials where the pressure in cooling system 700 is greater than in the cathode flowpath 336 and cathode 330. In a first operational mode, three-way valve 730A is positioned to allow an oxygen-bearing fluid coming from cathode flowpath 336 to pass through the inlet section 750A and into a reaction site within HRU 710 to promote the catalytic reaction between the oxygen in the fluid and any residual (unreacted) hydrogen present in the coolant. In a second operational mode, three-way valve 730A is positioned to allow excess pressure built up in cooling system 700 to be vented to the ambient environment through outlet section 750B, thereby reducing the pressure in the coolant tank 720 and allowing additional air feed from the cathode flowpath 336 in situations where the pressure in the cathode flowpath 336 is lower than in the cooling tank 720. An advantage of the three-way valve 730A is its simplicity; by having multiple fluid flowpaths controlled through a single valve, overall system cost, size and efficiency is enhanced. In addition, by having only one path be open, the three-way valve 730A represents a failsafe concept. Coolant system 700 may include an additional pressure relief valve 740 to ensure that pressure disparities between the tank 720 and the ambient do not become too large. In one form, the valve 740 can be integrated into a pressure-relief cap (shown in FIGS. 4A and 4B). In other forms, valve 740 can be formed from disparate valve components, one to relieve overpressure within the tank 720 and one to relieve underpressure. In either configuration, the valve can be a passive spring-biased device (as shown) or responsive to a controller (not shown) that is signally coupled to a sensor (not shown).

The pressure within the cathode flowpath 336 is dependent upon the operational status of the fuel cell 300. For example, during periods where there are low power demands on the fuel cell 300, such as during idle or related standby conditions, or during fuel cell system shutdown, the exhaust pressure produced at the cathode exhaust is relatively low. Without appropriate flow control componentry, such as check valve 760 or three-way valve 730A, any overpressure in the coolant tank 720 would force its way into the cathode flowpath 336. While it is believed that pressure buildup in the reservoir 720 and the cathode flowpath 336 of the fuel cell 300 generally provides ample driving force to move fluids contained within the assembly, it will be appreciated by those skilled in the art that supplemental pressurizing means can be used in ways analogous to the compressor 100C of FIG. 1. Thus, in those less frequent circumstances where no positive pressure differential exists in the cathode flowpath 336 over the cooling system 700, such supplemental pressure may be supplied by intermittent or increased operation of compressor 100C or related flow-enhancing device. Otherwise, by relieving the pressure buildup in the cooling system 700, the pressure in the cathode flowpath 336 should be sufficient to allow the oxygen-bearing compound to flow into HRU 710 and other parts of the cooling system 700. Thus, during periods of normal fuel cell operation, any excess pressure that builds up around the catalytic reaction site of HRU 710 is vented through outlet section 750B and a fluidly coupled exhaust.

Referring with particularity to FIG. 3, a pair of two-way valves 730B, 730C could be used to ensure that adequate pressure differentials are maintained between the cathode flowpath 336 and the cooling system 700. These two valves can be made to function is a way that is generally similar to the three-way valve 730A depicted in FIG. 2. One advantage of employing two valves is the ability to achieve a thorough degree of hydrogen purging. By having a dedicated inflow line, shown in the figure as extending from the bottom of valve 730B to coolant tank 720, and a dedicated outflow line, shown in the figure as extending from the upper left of tank 720 to the bottom of valve 730C, a more rapid, thorough purging of gaseous material from tank 720 can be effected than through the use of a single line used for both inflow and outflow. As mentioned above, the fuel cell system 1 may further include a compressor 100C (an example of which is shown in FIG. 1), blower or related device to pressurize one or both of the fuel cell reactants. By having the excess pressure from the coolant tank 720 reduced through one of the aforementioned valve arrangements, the need to operate the compressor 100C to overpressure the cathode exhaust is kept to a minimum or reduced altogether, thereby reducing parasitic losses. It will be appreciated by those skilled in the art that it is desirable to balance increased pressures in the cathode flowpath 336 with a similar rise of pressure in anode flowpath 316 to avoid adverse impacts on the electrolyte layer (membrane) 320.

Referring next to FIGS. 4A and 4B, details of the connection between the HRU 710 and the coolant tank 720 are shown for the configuration of FIG. 2, where a single three-way valve 730A is used. It will be understood that the configuration of the two two-way valves 730B and 730C of FIG. 3, although not shown connected to the device of FIGS. 4A and 4B, is equally applicable as the single three-way valve 730A. Referring with particularity to FIG. 4A, the coolant tank 720 is segmented into two reservoirs: a high temperature section 720A and a low temperature section 720B. Although a dual reservoir tanks is shown, it will be appreciated by those skilled in the art that a single reservoir approach may also be used with either of the proposed valve arrangements. In the configuration depicted in the figure, the low temperature section 720B could be used to provide additional cooling to temperature-sensitive components, such as electronic modules. In such case, cooling reflow lines 780 can be used to convey such coolant to and from the low temperature section 720B.

Inlet section 750A of conduit 750 feeds the oxygen-bearing fluid coming from the cathode flowpath 336 of FIG. 2 into valve 730A so that, depending on the operational mode of the valve 730A, the fluid can be routed to the HRU 710 through intermediate section 750C or through outlet section 750B, this latter situation where additional hydrogen removal may not be necessary. For example, a sensor 795 could be used to measure the hydrogen concentration in the coolant, while a controller (not shown) could be used to sense the signal and, based on a predetermined algorithm, determine that no additional hydrogen purge gas (in the form of oxygen-bearing fluid) may be necessary. Sensor 795 may be used for measuring other parameters, such as temperature or pressure.

Referring with particularity to FIG. 4B, the cutaway view shows the reaction site inside the HRU 710, as well as the internal connections that facilitate the reaction of excess hydrogen resident in the coolant with oxygen from the cathode flowpath 336. Hitherto unreacted gaseous hydrogen that is in the coolant bubbles up from the coolant tank 720 and into HRU 710. Within a reaction chamber of HRU 710 is a bed of pellets 770 used to perform the catalytic reaction between the hydrogen and oxygen. In one form, the pellets 770 may be made from six mil diameter ceramic spheres that are coated with an appropriate noble metal. A splash-preventing separator 790, which may be in the form of a stainless steel mesh or related screen, is clamped within HRU 710. The splash protection made possible by the separator 790 inhibits the contact of coolant in tank 720 with the catalyst pellets 770. The hydrogen which is dissolved in the coolant or present as bubbles is offgassed from the coolant tank 720, rising into the HRU 710. The water generated by the catalytic reaction in the area of the pellets 770 can then drop down through the separator 790 to be added to the existing coolant supply in tank 720. Although the quantity of this generated water is relatively small, the gravity-feed arrangement between the HRU 710 and the tank 720 is such that additional water management issues relating to this generation are advantageously avoided. Pressure relief valve 740 can be in the form of a cap, as shown.

During normal fuel cell operation, a load (such as a motor, in the case of automotive applications) is sufficient to ensure that significant reactant flow and concomitant high pressure forms in cathode flowpath 336. This relatively high pressure is greater than that building up in the coolant tank 720, and accordingly allows the oxygen-bearing fluid resident in the cathode flowpath to pass into the HRU 710 to react with the hydrogen therein. During periods where the load demands little of the fuel cell, the pressure caused by the fluid in the cathode flowpath 336 is significantly reduced, possibly to the point where it is exceeded by the pressure inside tank 720. Examples of such conditions include low power operating, such as at idle or (in the case of automotive applications) where a vehicle is parked. Another such situation is once the fuel cell has shut down, as hydrogen can continue to offgas for a significant time even after the system has been turned off. In all of these circumstances, there needs to be a way in which to reduce this adverse pressure condition. While it would be possible to rely on the operation of a compressor to boost the pressure of the fluid in the cathode flowpath 336, such an approach would entail the parasitic use of power to operate the compressor, and would hence be disadvantageous relative to the valve configurations depicted in FIGS. 2, 3, 4A and 4B. As discussed above, in situations where the pressure in the cooling system 700 exceeds that of the cathode 330 or cathode flowpath 336, three-way valve 730A (as well as the two two-way valves 730B, 730C of FIG. 3) are used to relieve the pressure, thereby allowing continued flow of oxygen-bearing fluid from the cathode flowpath 336 to the HRU 710 or other parts of the cooling system 700 or exhaust.

While certain representative embodiments and details have been shown for purposes of illustrating the invention, it will be apparent to those skilled in the art that various changes may be made without departing from the scope of the invention, which is defined in the appended claims.

What is claimed is:

1. A fuel cell assembly comprising:
    at least one fuel cell comprising an anode configured to accept a hydrogen-bearing compound therein, a cathode configured to accept an oxygen-bearing compound therein and a flowpath corresponding to each of said anode and cathode and in respective fluid communication therewith; and
    a cooling system in thermal communication with said at least one fuel cell to regulate a temperature therein, said cooling system comprising:
        a coolant reservoir configured to contain a quantity of coolant therein;
        at least one flow regulating device configured to permit selective relief of pressure buildup in said cooling system such that said oxygen-bearing compound can flow from said cathode flowpath to said cooling system over a substantial majority of pressures generated during operation of said at least one fuel cell; and
        a hydrogen removal unit fluidly coupled to said coolant reservoir such that upon receipt of unreacted hydrogen extant in said coolant and upon further receipt of at least a portion of said oxygen-bearing compound from said cathode flowpath, a reaction in said unit converts at least a portion of said hydrogen into water.

2. The assembly of claim 1, wherein said cathode flowpath comprises a cathode inlet flowpath configured to receive said oxygen-bearing compound therein, and a cathode exhaust flowpath configured to receive a reaction product formed by said at least one fuel cell.

3. The assembly of claim 1, wherein said at least one flow regulating device comprises at least one valve.

4. The assembly of claim 3, wherein said at least one valve comprises a three-way valve fluidly coupled to said cathode flowpath, said unit and an exhaust.

5. The assembly of claim 3, wherein said at least one valve comprises a first valve configured to control flow between said cathode flowpath and said hydrogen removal unit, and a second valve configured to control flow between an exhaust and at least one of said coolant reservoir and said unit.

6. The assembly of claim 1, wherein said unit comprises a catalytic reaction site.

7. The assembly of claim 1, wherein at least one of said at least one flow regulating devices is responsive to a predetermined pressure threshold.

8. The assembly of claim 1, wherein at least one of said at least one flow regulating devices is responsive to a predetermined control signal.

9. A vehicle comprising the fuel cell assembly of claim 1, wherein said fuel cell assembly serves as a source of motive power for said vehicle.

10. The assembly of claim 1, wherein said coolant reservoir comprises a coolant tank comprising:
    a first section configured to contain said fluid at a first temperature; and
    a second section in selective fluid communication with said first section, said second configured to contain said fluid at a second temperature that is lower than said first temperature.

11. A device for reducing hydrogen presence in a fuel cell cooling system, said device comprising:
    a hydrogen removal unit configured to receive hydrogen present in said cooling system such that a reaction between said hydrogen therein and oxygen received from a cathode flowpath in said at least one fuel cell converts at least a portion of said hydrogen into water; and
    at least one valve in fluid communication with said unit, said at least one valve configured to relieve a pressure buildup formed in said cooling system by said reaction so that a positive pressure difference can be maintained by said cathode flowpath over said cooling system during at least a majority of power settings of said at least one fuel cell.

12. The device of claim 11, wherein said at least one valve comprises a three-way valve.

13. The device of claim 11, wherein said at least one valve comprises a first valve configured to control flow between said cathode flowpath and said unit, and a second valve configured to control flow between an exhaust and at least one of said cooling system and said unit.

14. The device of claim 11, wherein said at least one valve further comprises a check valve fluidly disposed between said cathode flowpath and said unit such that in an adverse pressure gradient between the two, no coolant in said cooling system flows into said cathode flowpath.

15. A method of removing hydrogen from coolant that is used to regulate the temperature of an operating fuel cell, said method comprising:

conveying into a hydrogen removal unit at least a portion of an oxygen-bearing fluid that is being used as a reactant in said fuel cell;

configuring a cooling system to circulate coolant adjacent said fuel cell such that said coolant is in thermal communication with said fuel cell;

circulating said coolant through said unit such that said oxygen-bearing fluid and at least a portion of any residual hydrogen present in said coolant react with one another; and selectively relieving pressure built up in said cooling system such that said pressure is no greater than a pressure present in a portion of said fuel cell that conveys said oxygen-bearing fluid.

16. The method of claim 15, wherein said oxygen-bearing flowpath provides oxygen in a higher humidity form than exists in an ambient environment.

17. The method of claim 15, wherein said reaction within said unit is a catalytic reaction.

18. The method of claim 15, wherein said selective relieving of pressure comprises relieving said pressure built up once said pressure goes above a predetermined value.

19. The method of claim 15, wherein said selective relieving of pressure comprises actuating at least one valve that is fluidly coupled to said cooling system.

20. The method of claim 19, wherein said at least one valve comprises a three-way valve.

* * * * *